Patented Dec. 28, 1948

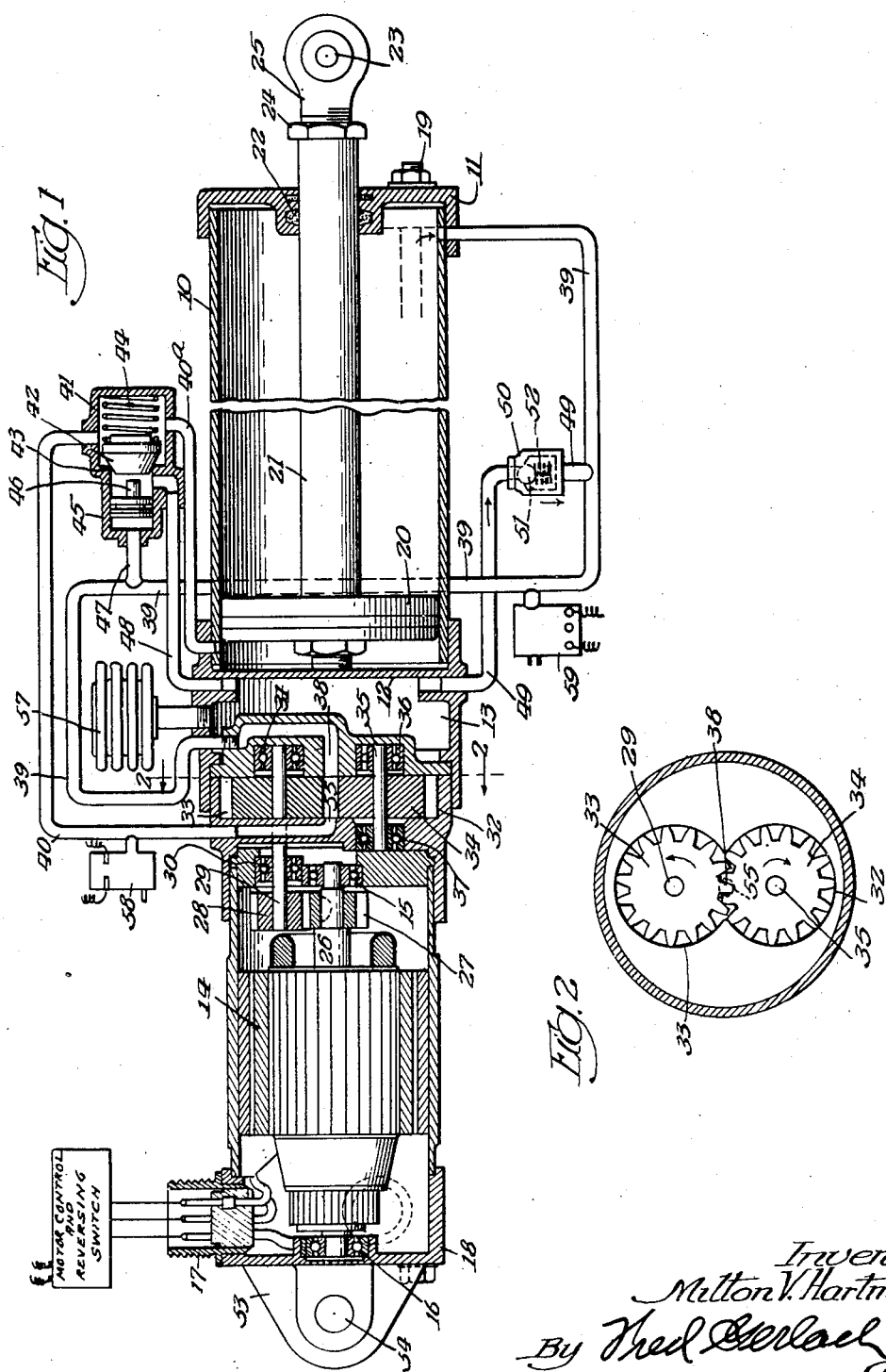

2,457,467

UNITED STATES PATENT OFFICE 2,457,467

ELECTRICALLY AND HYDRAULICALLY OPERATED EXTENSIBLE STRUT

Milton V. Hartman, Chicago, Ill., assignor to Consolidated Vultee Aircraft Corporation, San Diego, Calif., a corporation of Delaware Application March 8, 1945, Serial No. 581,699

4 Claims. (Cl. 60—52)

1

This invention relates, in general, to extensible strut devices, particularly adapted, though not necessarily limited in use, for the operation of aircraft mechanisms, such as landing gears, control surfaces, bomb doors, cowl flaps, and other mechanisms and parts which require considerable power to actuate them. More particularly, the invention relates to an extensible strut which is hydraulically and electrically actuated.

One of the objects of the invention is to provide an improved extensible strut of this character in which the parts are compactly assembled and are disposed in longitudinal alignment in order to adopt the strut for installation in a small space.

A further object of the invention is to provide an extensible strut device of this character which is operated by a self-contained, reversible electric motor and embodies an integral hydraulic pump or fluid circulating means.

A further object of the invention is to provide a strut device which is generally of new and improved construction, effectively and efficiently fulfills its intended purpose, and may be manufactured and installed at a comparatively low cost.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawing illustrating this invention, in which Fig. 1 is a view, partly in elevation, partly in section, partly broken away, and partly in schematic illustration, showing a strut embodying the invention; and Fig. 2 is a detail sectional view taken on line 2—2 of Fig. 1.

The strut which is shown in the drawing constitutes the preferred form or embodiment of the invention. It consists of an elongated tubular body portion in one end of which is arranged a cylinder 10 having an outer head 11 and an inner end member 12. The end member 12 forms a part of a reservoir or chamber 13, and beyond the chamber 13 and disposed within the other end of the body portion, is a reversible electric motor designated, generally, by the reference numeral 14. The armature shaft of the motor 14 is journaled in ball bearings 15—16, and the motor is adapted to be actuated from any suitable source of power, through the medium of plugs or terminals 17, to which a co-operating

2 member of an outside line is adapted to be connected.

The end 18 of the tubular body portion is adapted to be secured in position in any suitable manner, preferably by means of tie rods 19, any number of which may be provided, and which tie rods also engage and hold the end member 11 of the cylinder 10 in position. Disposed to reciprocate within the cylinder 10, and between the heads 11 and 12, is a piston 20 to which a piston rod 21 is connected such rod passes through suitable packing 22 in the head 11 and terminates exteriorly in an eye or loop 23 which may be attached to the rod in any suitable manner, such as by means of a nut 24 engaging a threaded portion 25. The latter is threaded into the outer end of the piston rod 21.

Connected to the shaft 26 of the rotor or armature of the motor 14, for rotation therewith, is a gear 27 which meshes with a gear 28 on a shaft 29. The last mentioned shaft is preferably journaled in ball bearings 30—31, which are supported by a suitable part of the body portion.

Within a chamber 32 is a gear pump consisting of intermeshing gears 33—34, the gear 33 being preferably mounted upon the shaft 29, while the gear 34 is mounted upon a shaft 35 which is journaled in suitable ball bearings 36—37. When the rotor of the motor is actuated, the gears 33—34 of the pump or fluid circulating mechanism will be rotated through the medium of the intermeshing gears 27—28. Rotation of the gears 33—34 causes fluid to circulate into and out of the cylinder 10 on opposite sides of the piston 20, in a manner which presently will be described. The chamber 13 is out of direct communication with the gear pump 33.

A passage 38 leads from the chamber 32, in which the gears 33—34 of the pump are located, and such passage has communication with the cylinder 10 on one side of the piston 20, through the medium of a pipe 39. A pipe 40 leads from the other side of the gear pump and communicates with the cylinder 10 on the other side of the piston 20 by way of a branch 40a. The pipe 40 and its branch 40a have communication with a valve casing 41 which is provided for the purpose of distributing fluid which is displaced by the piston rod 21 in the cylinder 10.

The valve casing 41 contains a slidably mounted valve member 42 which co-operates with a seat 43 and is held against the seat by means of a spring 44, in addition to fluid pressure which will be admitted into the valve casing 41 in a manner to be described. Within the valve casing is a fluid pressure actuated piston 45 that has connected to it a stem 46. A branch pipe 47 leads from the pipe 39 to the valve casing 41, and this branch pipe is provided to admit fluid under pressure to operate upon the piston 45, and thereby cause the stem 46 to engage and unseat the valve member 42. When the valve member 42 is unseated fluid under pressure is permitted to flow from the pipe 40 through the valve casing 41, and thence into the chamber 13 by way of a pipe 48.

Leading from the chamber 13, is a pipe 49 which has communication with the pipe 39 that leads to one end of the cylinder 10. Arranged within this pipe 49 is a valve chamber 50 having disposed therein a valve 51 which may be loaded by a spring 52, so as to keep the valve 51 normally closed, and also closed when the piston is moving to the left as viewed in Fig. 1. When, however, the piston 20 is moving to the right as viewed in Fig. 1, to expand the expansible strut, the displacement of the volume of fluid from the cylinder 10 on one side of the piston, will be smaller than the hydraulic fluid required in the portion of the cylinder 10 on the other side of the piston, due to the presence of the piston rod 21 in the cylinder. In order to compensate for this differential in volume, the hydraulic chamber 13 is provided.

With this improved construction, it will be manifest that the parts are arranged in longitudinal alinement, thereby necessitating a minimum of space for installation. One end of the strut, such as the end 53, may be anchored in any suitable manner to a suitable support, through the medium of anchoring bolts which pass through the eye 54. The eye 23 at the end of the piston rod may be connected in any suitable manner to the part to be moved.

With the parts in the position shown in Fig. 1, that is, with the sections of the strut drawn together or in what might be termed a collapsed condition, the electric motor 14 is started, and this in turn will operate the gears 33—34 constituting the pump, to drive them in the direction indicated by the arrows in Fig. 2.

The direction of flow of the fluid during the operation of extending the piston rod 21, or of imparting a relative movement of the cylinder and piston in one direction, will be as follows: the electric motor driving the gears 33—34, causes the fluid to flow through the pump port 55 into the pipe 40, thence through the valve casing 41 to the high pressure portion of flow equalizing valve 41, and subsequently to the hydraulic actuating cylinder 10 on one side of the piston 20, forcing the piston 20 and the piston rod 21 in a direction to extend the piston rod beyond the end of the cylinder 10. Hydraulic fluid in the outer portion of the cylinder 10 is displaced by this action of the piston, and flows from such portion out through the pipe 39, back to the passage 38 of the gear pump consisting of gears 33—34, thus completing the circuit.

It will be manifest, however, that by reason of the piston rod 21, the hydraulic fluid displaced in the outer portion of the cylinder 10, is smaller in volume than the hydraulic fluid required on the other side of the piston 20. In order to compensate for this differential in volume, the hydraulic reservoir at chamber 13 is provided. Fluid from this reservoir 13 will be introduced into the circuit during the movement of the piston 20 outwardly from the position shown in Fig. 1. This is accomplished in the following manner: in supplying the proper volume of fluid to the inner portion of the cylinder 10, that is, the portion on the side of the piston opposite to that on which the piston rod 21 is located, the electrically driven pump, to-wit, the gears 33—34, will cause a suction in the system of pipes and passages which connects the portion of the cylinder on the piston rod side with the reservoir 13, through the check valve 50, thus drawing the proper additional amount of fluid from the reservoir 13 through the check valve 50, in the direction of the arrow.

If desired, and in order to create an entirely self-contained hydraulic circuit without the use of bleeder holes or compensating valves into the atmosphere, and in order to make the functioning of the device independent of gravity, a Sylphon or spring loaded diaphragm 57 may be provided, which is connected with the reservoir 13. Upon the complete extension of the actuating or piston rod 21 and piston 20, the action of the electrically driven pump 33—34 will continue to build up excessive pressure in the system of pipes and passages which connects the passage 55 of the pump with the inner portion of the cylinder 10, through the volume equalizer valve 41, which causes an automatically operated pressure switch 58 (diagrammatically illustrated) to break the circuit from an external source of electric power supply to the motor 14, thus stopping the pump and the further accomulation of pressure. Any automatically operated switch suitable for this purpose may be employed.

To retract the piston 20 and piston rod 21, the motor 14 will be operated to actuate the pump gears 33—34 in the opposite direction. This causes a flow of the fluid from the passage 38 through the pipe 39, and into the cylinder 10 on the piston rod side of the piston, thereby forcing the piston 20 and the piston rod 21 back to the position shown in Fig. 1.

The flow of hydraulic fluid which is being displaced from the cylinder on the inner side of the piston 20, through the action of the piston, will be as follows: the displaced portion of the fluid leaves the cylinder on the inner side of the piston through the branch pipe 40a, volume equalizer valve 41 through the pipe 40, back to the passage 55 of the gear pump, thus completing the circuit. The volume of fluid, during this operation, displaced on the inner side of the piston, will be greater than the volume of fluid supplied to the cylinder 10 on the piston rod side of the piston. Therefore, in order to compensate for this differential in volume, the volume compensator valve 41 is provided, which functions, under these conditions, in the following manner: the fluid under pressure leaves the passage 38 of the gear pump 33—34, and flows through the pipe 39 into the cylinder 10 on the piston rod side of the piston. At the same time, the pressure is communicated through the branch pipe 47 to the valve casing 41, and operates upon the piston 45 in such casing, to force the stem 46 thereof against the valve member 42, to move it from its seat, and against the stress of the spring 44, permitting the excess volume of fluid from the cylinder 10 on the inner side of the piston, to by-pass through the pipe 48 into the reservoir 13.

Upon the complete retraction of the piston 20 and piston rod 21, excess pressure will be created in the pipes and passages which connect the passage 38 with the outer portion of the cylinder 10. This accumulation of pressure will cause a limit switch 59 to break the circuit from an outside source of electrical power to the electric motor 14, thus stopping the pump 33—34 and the further accumulation of pressure. The limit switch 59 may be of any desired construction suitable for this purpose, and is illustrated in the accompanying drawing, diagrammatically.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. An electrically and hydraulically operated extensible strut comprising an elongated casing having a plurality of fixed, spaced apart cross partitions whereby it is divided into a longitudinally extending cylinder at one end, a motor compartment at the other end, and a fluid reservoir and a pump compartment between the cylinder and the motor compartment, a piston slidably mounted in the cylinder and provided with an upwardly projecting piston rod extending slidably through the cross partition that defines the outer end of the cylinder, a reversible electric motor mounted in the motor compartment, a gear pump mounted in the pump compartment and connected for drive by the electric motor, means forming a first fluid passage extending between, and communicating with, one side of the gear pump and the inner end of the cylinder, means forming a second fluid passage extending between, and communicating with, the other side of the gear pump and the outer end of the cylinder, means forming a third fluid passage extending between, and communicating with, the reservoir and the second passage, a check valve positioned in the third passage and closing in the direction of the reservoir, a valve casing interposed in the first passage and having an outlet and a spring closed valve for the outlet, means forming a fourth fluid passage leading from the outlet to the reservoir, and means operative in response to the pressure of the fluid in said second passage when the pump is driven to supply fluid under pressure through said second passage into the outer end of the cylinder to open said spring closed valve.

2. An electrically and hydraulically operated extensible strut comprising an elongated casing having a plurality of fixed, spaced apart cross partitions whereby it is divided into a longitudinally extending cylinder at one end, a longitudinally extending motor compartment at the other end, a fluid reservoir adjacent the inner end of the cylinder, and a pump compartment between the reservoir and the motor compartment, a piston slidably mounted in the cylinder and provided with an outwardly projecting piston rod extending slidably through the cross partition that defines the outer end of the cylinder, a reversible electric motor mounted in the motor compartment and arranged so that the armature extends lengthwise of the latter, a gear pump mounted in the pump compartment and connected for drive by the electric motor, means forming a first fluid passage extending between, and communicating with, one side of the gear pump and the inner end of the cylinder, means forming a second fluid passage extending between, and communicating with, the other side of the gear pump and the outer end of the cylinder, means forming a third fluid passage extending between, and communicating with, the reservoir and the second passage, a check valve positioned in the third passage and closing in the direction of the reservoir, a valve casing interposed in the first passage and having an outlet and a spring closed valve for the outlet, means forming a fourth fluid passage leading from the outlet to the reservoir, and means operative in response to the pressure of the fluid in said second passage when the pump is driven to supply fluid under pressure through said second passage into the outer end of the cylinder to open said spring closed valve.

3. An electrically and hydraulically operated extensible strut comprising an elongated casing having a plurality of fixed, spaced apart cross partitions whereby it is divided into a longitudinally extending cylinder at one end, a motor compartment at the other end, and a fluid reservoir and a pump compartment between the cylinder and the motor compartment, a piston slidably mounted in the cylinder and provided with an outwardly projecting piston rod extending slidably through the cross partition that defines the outer end of the cylinder, a reversible electric motor mounted in the motor compartment, a gear pump mounted in the pump compartment, and connected for drive by the electric motor, means forming a first fluid passage extending between, and communicating with, one side of the gear pump and the inner end of the cylinder, means forming a second fluid passage extending between, and communicating with, the other side of the gear pump and the outer end of the cylinder, means forming a third fluid passage extending between, and communicating with, reservoir and the second passage, a check valve positioned in the third passage and closing in the direction of the reservoir, a valve casing interposed in the first passage and having an outlet and a spring closed valve for the outlet, means forming a fourth fluid passage leading from the outlet to the reservoir, and means operative in response to the pressure of the fluid in said second passage when the pump is driven to supply fluid under pressure through said second passage into the outer end of the cylinder to open said spring closed valve, the last mentioned means consisting of a coacting piston and cylinder and a fluid passage leading from the second passage to the last mentioned cylinder.

4. An electrically and hydraulically operated extensible strut comprising an elongated casing having a plurality of fixed, spaced apart cross partitions whereby it is divided into a longitudinally extending cylinder at one end, a motor compartment at the other end, and a fluid reservoir and a pump compartment between the cylinder and the motor compartment, a piston slidably mounted in the cylinder and provided with an outwardly projecting piston rod extending slidably through the cross partition that defines the outer end of the cylinder, a reversible electric motor mounted in the motor compartment, a gear pump mounted in the pump compartment and connected for drive by the electric motor, means forming a first fluid passage extending between, and communicating with, one side of the gear pump and the inner end of the cylinder, means forming a second fluid passage extending between, and communicating with, the other side of the gear pump and the outer end of the cylinder, means forming a third fluid passage extending between, and communicating with, the reservoir and the second passage, a check valve positioned in the third passage and closing in the direction of the reservoir, a valve casing interposed in the first passage and having an outlet and a spring closed valve for the outlet, means forming a fourth fluid passage leading from the outlet to the reservoir, means operative in response to the pressure of the fluid in said second passage when the pump is driven to supply fluid under pressure through said second passage into the outer end of the cylinder to open said spring closed valve, and an expansible and contractible bellows connected to, and communicating with, said reservoir.

MILTON V. HARTMAN.

REFERENCES CITED

The following references are of record in the file of this patent:

UNITED STATES PATENTS

| Number | Name | Date |
|---|---|---|
| 337,118 | Belden | Mar. 2, 1886 |
| 1,291,918 | Kenney | Jan. 21, 1919 |
| 1,343,117 | Dana | June 8, 1920 |
| 1,616,841 | Beebe | Feb. 8, 1927 |
| 1,690,181 | Sederholm | Nov. 6, 1928 |
| 1,760,915 | Robson | June 3, 1930 |
| 1,921,590 | Staude | Aug. 8, 1933 |
| 1,940,668 | Ernst | Dec. 26, 1933 |
| 2,020,618 | Persons | Nov. 12, 1935 |
| 2,035,813 | Johnson | Mar. 31, 1936 |
| 2,357,508 | Ernst | Sept. 5, 1944 |

FOREIGN PATENTS

| Number | Country | Date |
|---|---|---|
| 750,179 | France | May 22, 1933 |